(12) United States Patent
Vidot

(10) Patent No.: US 6,592,283 B1
(45) Date of Patent: Jul. 15, 2003

(54) DEVICE FOR THE EMBRITTLEMENT OF A MOTOR VEHICLE PEDAL PIVOT PIN

(75) Inventor: Jean-Paul Vidot, Borderes sur l'Echez (FR)

(73) Assignee: Giat Industries, Versailles (FR)

( * ) Notice: Subject to any disclaimer, the term of this patent is extended or adjusted under 35 U.S.C. 154(b) by 0 days.

(21) Appl. No.: 09/674,859

(22) PCT Filed: May 14, 1999

(86) PCT No.: PCT/FR99/01154

§ 371 (c)(1),
(2), (4) Date: Nov. 7, 2000

(87) PCT Pub. No.: WO99/59844

PCT Pub. Date: Nov. 25, 1999

(30) Foreign Application Priority Data

May 20, 1998 (FR) .............................................. 98 06507

(51) Int. Cl.[7] ................................................ F16D 9/00
(52) U.S. Cl. ............................... 403/11; 403/2; 403/34; 180/274; 180/282
(58) Field of Search ................... 180/274, 282; 74/512, 513, 514, 560; 92/129; 60/582, 403; 403/2, 11, 12, 34–36, 38; B60T 7/06

(56) References Cited

U.S. PATENT DOCUMENTS 5,314,206 A * 5/1994 Vollmer .................. 280/801.1

FOREIGN PATENT DOCUMENTS

| DE | 43 05 049 | * 8/1994 | ........... B60R/21/00 |
| DE | 195 15 852 | * 11/1995 | ........... B60R/21/09 |
| DE | 195 15 852 A 1 | 11/1995 | |
| DE | 196 17 372 | * 1/1998 | ............ B60T/7/06 |
| DE | 196 17 372 C 1 | 1/1998 | |
| FR | 2 764 715 | * 12/1997 | ............ G05G/1/14 |
| FR | 2 764 715 A | 12/1998 | |
| GB | 2 322 836 A | 9/1998 | |

OTHER PUBLICATIONS

Translation: DE 196 17 372 Jan. 1998 DE Lucas IND PLC.*

WO 97/13666 Apr. 1997 IIT Automotive Europe GmbH.*

* cited by examiner

Primary Examiner—Anthony Knight
Assistant Examiner—Michael P. Ferguson
(74) Attorney, Agent, or Firm—Oliff & Berridge, PLC

(57) ABSTRACT

The invention concerns a device for the embrittlement of a motor vehicle pedal pivot pin, characterized in that the pin comprises at least a starting point of fracture and reinforcing means arranged at the starting point of fracture for increasing the pin resistance, the reinforcing means being capable of moving by action of motoring means to be positioned at some distance from the starting point of fracture thereby ensuring that the pin is embrittled.

10 Claims, 3 Drawing Sheets

DEVICE FOR THE EMBRITTLEMENT OF A MOTOR VEHICLE PEDAL PIVOT PIN

BACKGROUND OF THE INVENTION

The technical scope of the invention is that of embrittlement devices for a mechanical element, notably embrittlement devices used in automobile safety systems.

A device allowing an automobile vehicle brake pedal to be separated from its support pin by pyrotechnic means is known notably by patent DE19515852.

This system implements explosive bolts that, when ignited further to the detection of a shock, release the pedal from its support thus avoiding the serious injuries generally sustained to the legs and ankles of the driver in the event of a frontal collision as a result of the pedal.

The major drawback to such a device lies in the event of the inadvertent ignition of the explosive bolts, the brake pedal becomes entirely useless, seriously prejudicing the operating safety of the vehicle.

Patent DE19617372 describes an analogous device in which a pyrotechnic system ensures the fracturing of the connection between a brake pedal and the rod of the master cylinder or between the brake pedal and its hinge. After such a device has been activated no braking capability remains whatsoever.

Various mechanical systems fitted with embrittlement means are known elsewhere, for example, the stages of a booster rocket that must separate in flight, the grappling ropes of a parachute supporting a load and that must be released immediately, or the steering column of a vehicle that must be moved away from the driver in the event of an accident.

Patent U.S. Pat. No. 5,314,206 describes a safety device for automobile vehicle seats. This device comprises a piston that is displaced by drive means when the belt is attached by a passenger and that ensures the reinforcement of the seat and/or its sliding rail link.

In any event, providing a pre-embrittled area in the design itself prejudices the mechanical strength of the device, and thus its operational safety.

Therefore, the solution involving deliberate fracturing when needed (more often than not by pyrotechnic means) is preferred over that involving embrittlement. However, inadvertent ignition deprives the element of its normal operating capacities and prejudices its safety.

SUMMARY OF THE INVENTION

The aim of the invention is to propose an embrittlement device for a swivel pin of an automobile pedal that does not suffer from such drawbacks.

Thus, the embrittlement device according to the invention is of a structure such that, even in the event of the inadvertent activation of the embrittlement, the pedal remains operational to a certain degree.

The subject of the invention is thus an embrittlement device for a swivel pin of an automobile pedal, such device being characterised in that the pin incorporates at least one incipient fracture and at least one reinforcement means at right angles to the incipient fracture and strengthening the pin, the reinforcement means being able to be displaced under the action of drive means to take up a position at a distance from the incipient fracture thereby ensuring the embrittlement of the pin.

According to a particular embodiment, the incipient fracture is made in the form of a reduction of the shearable surface, the reinforcement means being placed at right angles to the incipient fracture and thus enabling the shearable surface to be increased.

According to another embodiment, the reinforcement means can comprise means ensuring their connection in rotation with the pin on the one hand and with the incipient fracture on the other thereby ensuring a reinforcement in torsion of the pin.

Advantageously, the drive means comprise a pyrotechnic gas generator.

The pin can be a hollow rod incorporating at least one groove forming the incipient fracture and the reinforcement means can be constituted by at least one piston able to be displaced by the gas pressure.

According to another characteristic, the piston can be held axially in place by a shearable lock.

According to a particular embodiment, the hollow rod can incorporate two grooves constituting incipient fractures, and two reinforcement means, first reinforcement means constituted by a first piston and second reinforcement means constituted by a second hollow piston, the second piston pressing on the fist piston such as to be able to push it axially.

The second piston can be obturated by a sealing fail receiving the gas pressure and able to fracture over a certain pressure rate.

The pistons will advantageously press against one another via matching conical surfaces.

The piston can incorporate a shoulder co-operating at the end of its stroke with an abutment integral with the rod.

The pin can allow the automobile pedal to swivel with respect to a fork joint, the incipient fractures being located on either side of the wings of the fork joint.

BRIEF DESCRIPTION OF THE DRAWINGS

The invention will be better understood after reading the description that follows of the different embodiments, such description being made in reference to the appended drawings, in which.

DETAILED DESCRIPTION OF PREFERRED EMBODIMENTS

Figure 1:
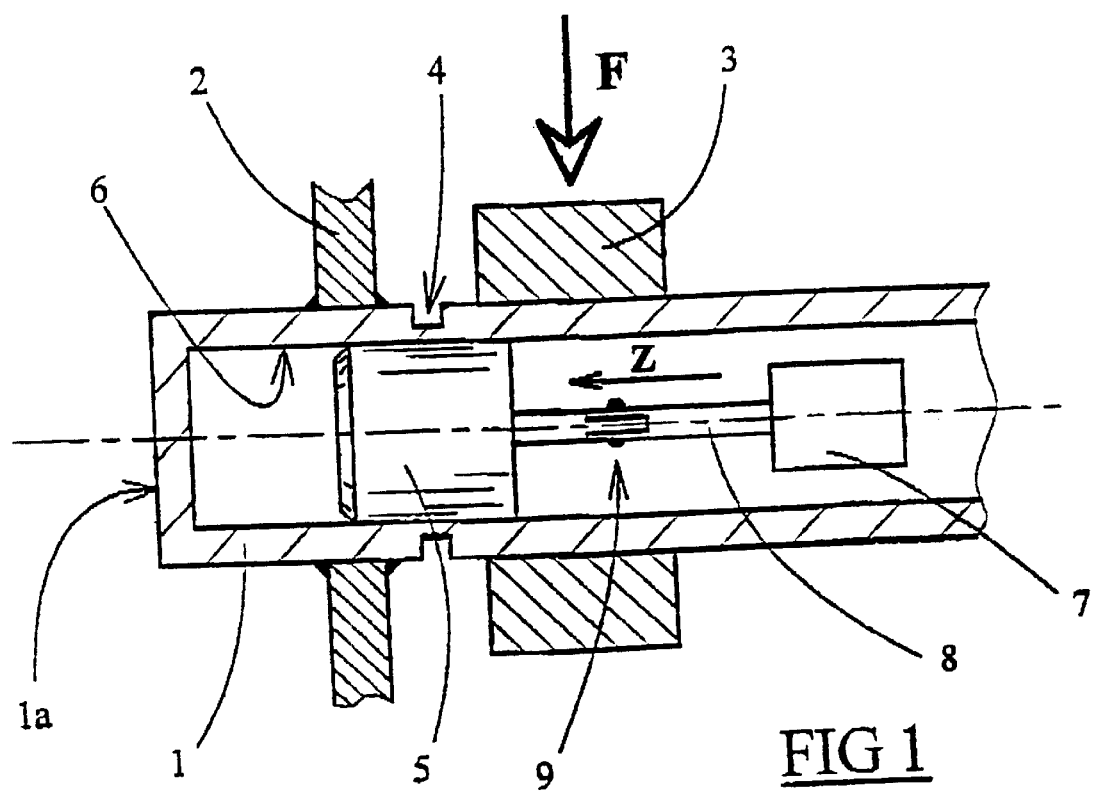
FIG. 1 is a section view of an embrittlement device according to a first embodiment of the invention, such device being shown before operation.

With reference to FIG. 1, a mechanical element 1, which is a swivel pin for an automobile pedal, is in the form of a tube obturated at one of its ends by a wall 1a. This tube is fastened to a support 2 (such as the wing of a fork joint) for example by welding or crimping and it receives a swivelling pedal 3. It is necessary to be able to separate the pedal 3 from the support 2 at a given time and to this end an embrittlement device for the connecting element 1 is provided.

The element 1 to be embrittled thus incorporates an incipient fracture 4, which in this case is constituted by a ring-shaped groove ensuring a reduction in the shearable surface of the tube.

The incipient fracture is placed between the pedal 3 and the support 2. Thus, acting on the pedal generates a force F on the element 1 and an opposite reaction is exerted by the support 2 on said element. This results in a shearing stress on the incipient fracture 4.

According to the invention, reinforcement means 5 are provided level with the incipient fracture 4. These means are constituted by a cylindrical piston sliding in the cylindrical bore 6 of the tube. Because of its arrangement at right angles to the incipient fracture 4, the piston strongly increases the section to be sheared at this point and ensures the mechanical strength of the element.

According to the invention, the reinforcement means 5 are able to be translated along direction Z under the action of drive means 7 to take up a position at a distance from the incipient fracture 4.

The drive means 7 can be constituted, for example, by an electrically-controlled actuator (such as a micro-engine) that will push a rod 8 fastened to the piston by a hinge 9.

Control electronics (not shown) will cause the drive means to become operative when the embrittlement of the element 1 is required.

Figure 2:
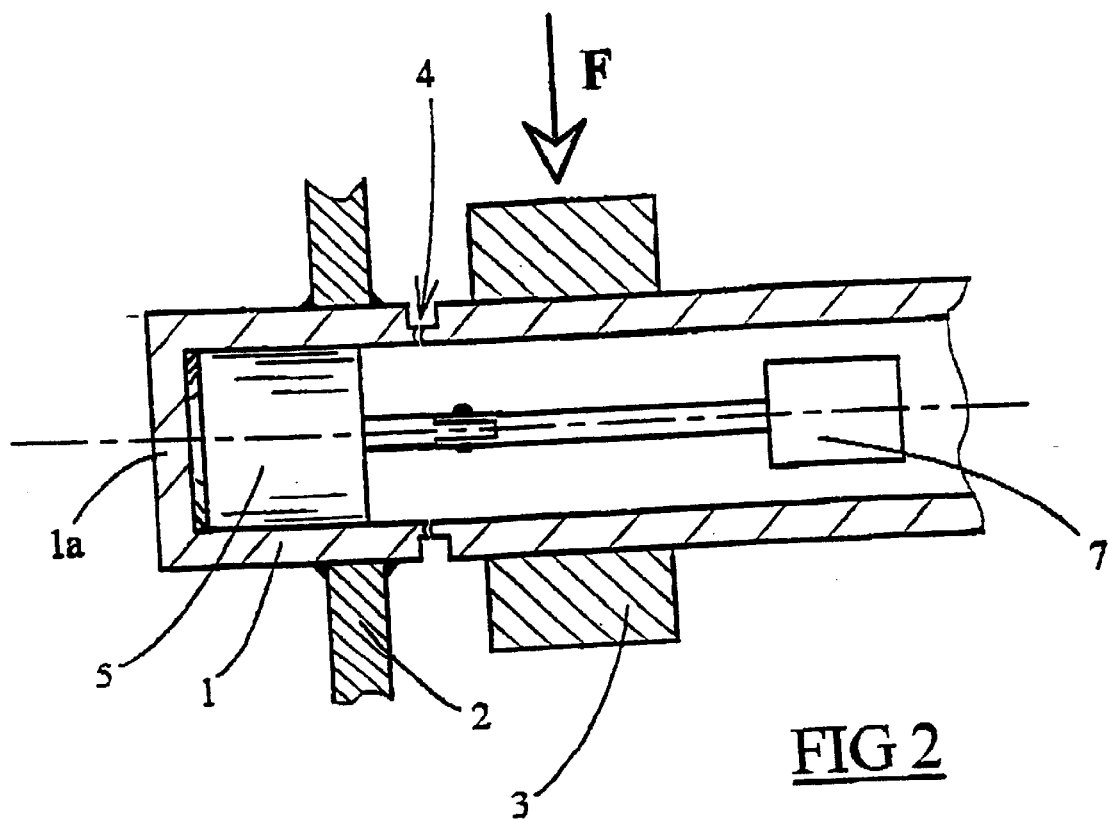
FIG. 2 is an analogous view to that of the previous one shown after operation.

FIG. 2 shows the systems when the drive means have pushed the piston 5. Said piston is in abutment against the wall 1a, and is therefore no longer opposite the incipient fracture 4. The element 1 is embrittled and the shear stress caused by the pedal 3 causes the element 1 to fracture level with the incipient fracture 4.

It is easy to see how the device according to the invention allows a mechanical element to be defined whose shear strength is not affected when the reinforcement means are positioned level with the incipient fracture. Activating the displacement of the reinforcement means does not cause fracturing to occur directly as is the case in known systems but merely causes a reduction in the shear strength that leads to fracture only when the load corresponds to the predetermined specifications.

The Expert will easily dimension the incipient fracture such as to define a system that will only fracture at a given force F value. We see that if the system is not in an operational condition with a pedal onto which a given force F is exerted, a displacement of the reinforcement means will not lead to the fracture of the element 1.

Thus, a brake pedal can be dimensioned so as to fracture at a given force that corresponds to that which would occur during a frontal collision at a certain energy level. Serious injuries caused by the pedals to the legs of the driver will thus be avoided. This pedal can, in fact, withstand a normal force exerted by the driver during an incident of lesser seriousness. Thus, the inadvertent activation of the drive means will not reduce the braking capabilities available to the driver and driving safety will be maintained.

The drive means can, by way of a variant, be formed of a pneumatic or hydraulic actuator. They can advantageously be constituted by a pyrotechnic gas generator.

Figure 3:
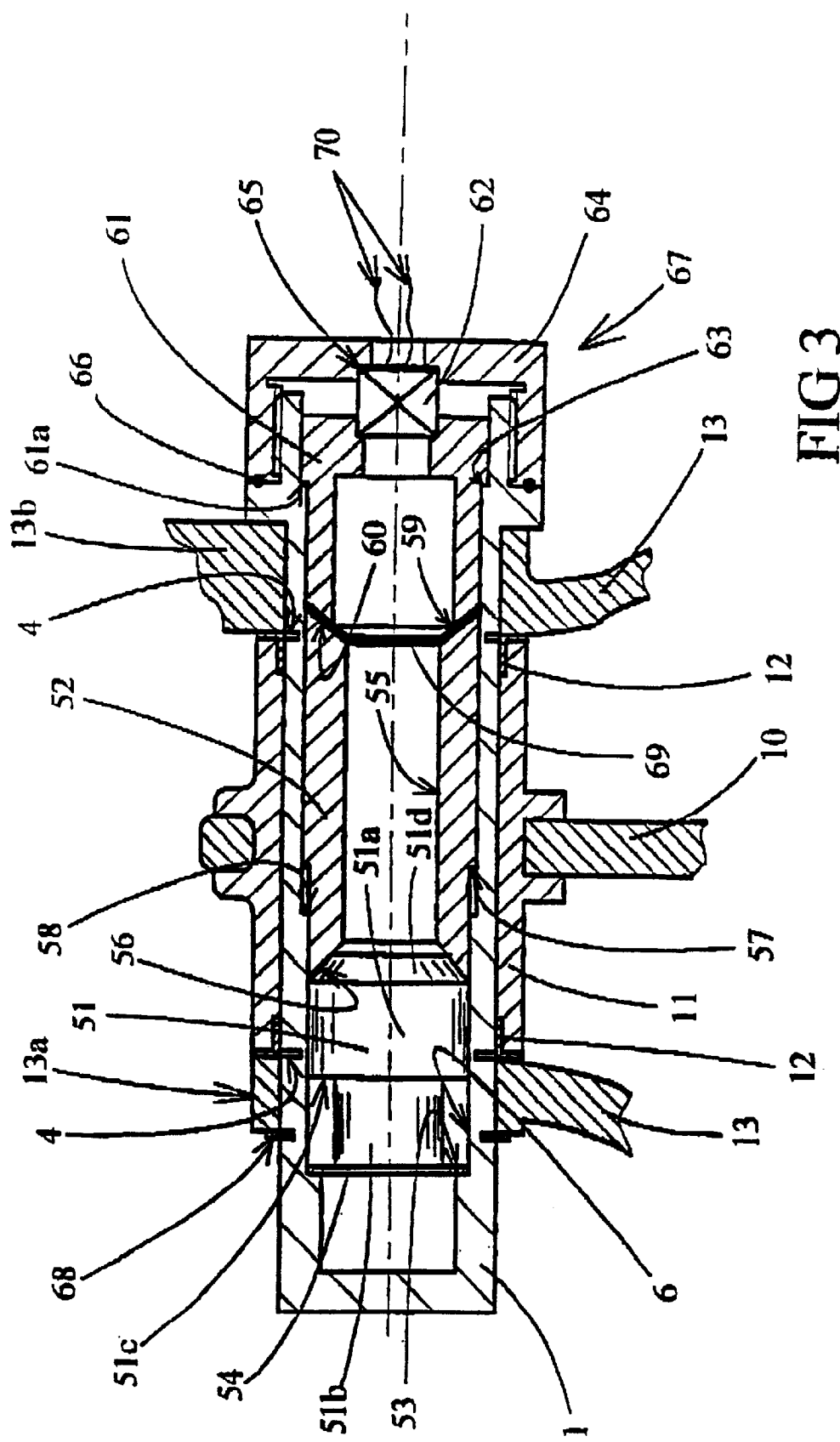
FIG. 3 is a section view of an embrittlement device according to a second embodiment of the invention, such device being shown before operation.
Figure 4:
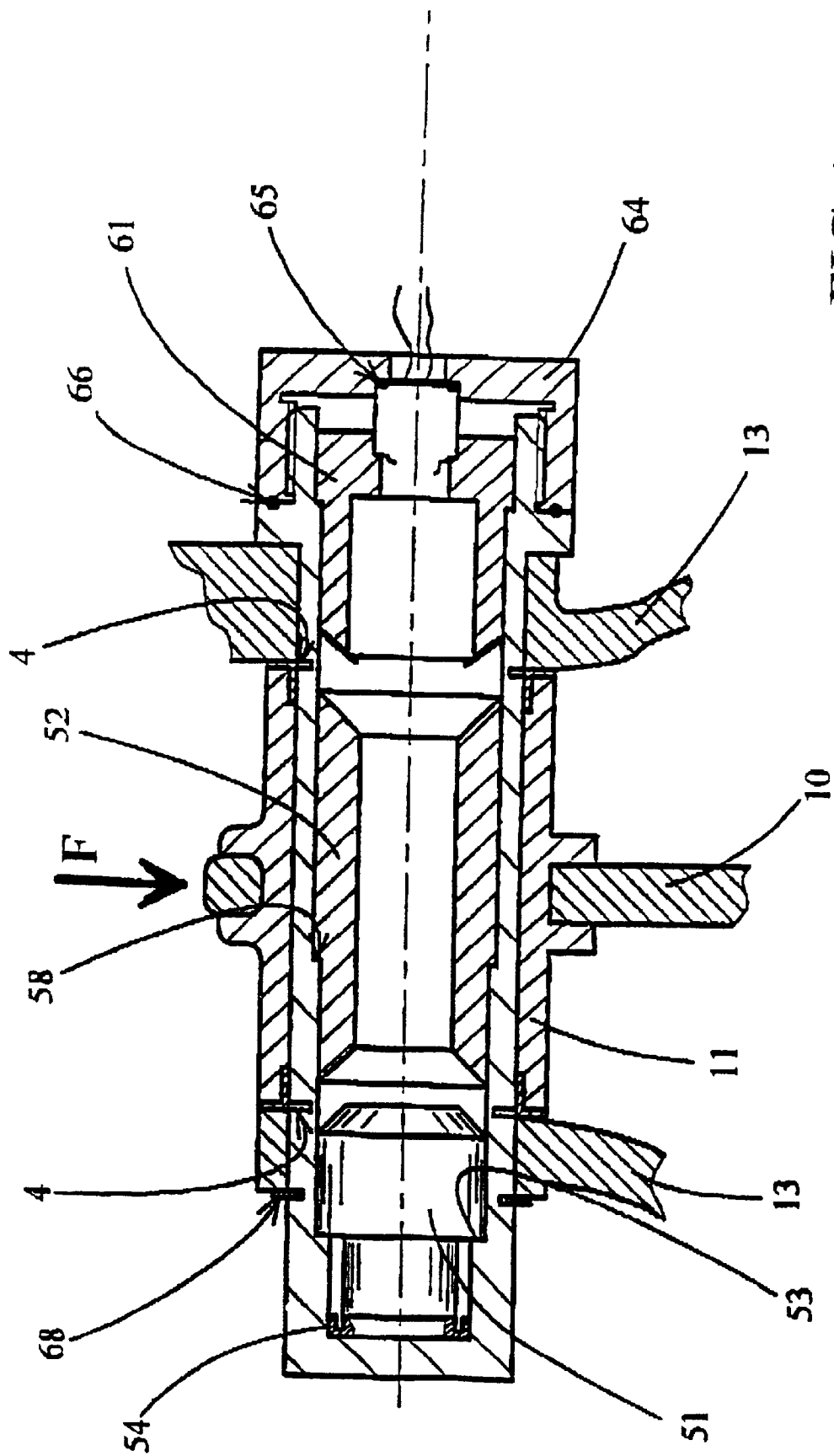
FIG. 4 is an analogous view to that of the previous one shown after operation.

FIGS. 3 and 4 thus show a second embodiment of the invention implementing a gas-generating pyrotechnic component (for example a squib).

FIG. 3 shows the system in its starting state (before operation). The mechanical element 1 is, in this case, a swivel pin for a brake pedal 10 of an automobile vehicle.

The pedal 10 is integral (for example by crimping) with a sleeve 11 mounted free to rotate around the pin 1. Bearings 12 are placed between the pin 1 and the sleeve 11.

The pin 1 is additionally supported by a fork joint 13 integral with the vehicle floor. The fork joint incorporates two wings 13a and 13b, and the pin 1, in this example, incorporates two ring-shaped incipient fractures 4, each incipient fracture being located between the sleeve 11 and a wing 13a or 13b. The pin incorporates an enlarged head 67 that presses on one of the wings 13b of the fork joint 13. It is immobilised with respect to the fork joint 13 by means of a slotted washer 68 arranged in a groove in the pin.

The pin is hollow and contains two reinforcement pistons 51 and 52, one for each incipient fracture, said pistons each having a cylindrical external surface enabling it to slide in the bore 6 in the pin 1.

The first piston 51 is solid and incorporates a part 51a of the same diameter as the bore 6 of the pin 1 and another part 51b of a reduced diameter. The shoulder 51c formed by the connection between these two parts is intended to cooperate with a ring-shaped abutment 53 arranged on the bore 6 of the pin 1. The piston also has a thin collar 54 carried on its reduced diameter end. This collar presses against the ring-shaped abutment 53 when the device is in its "before operation" state shown in FIG. 3. It constitutes a shearable lock intended to fracture in order to allow the displacement of the first piston 51 (FIG. 4).

Alternatively, it is possible for the collar 54 to be replaced by a washer that is separate from the piston 51.

The second piston 52 is hollow and thus incorporates an axial bore 55. It has a first conical end 56 pressing on a matching conical profile 51d on the first piston 51. Its external cylindrical surface has a shoulder 57 intended to co-operate with an abutment surface 58 arranged in the bore 6.

The second piston 52 incorporates a second conical end 59 that co-operates with a matching conical surface 60 of a support 61 of an electrically-controlled squib 62.

The squib support 61 is a tubular part arranged in the bore 6 of the pin 1. It ensures the axial immobilization of the two pistons 51, 52 and also allows a pyrotechnic squib 62 to be set into position. The support 61 is itself axially immobilized with respect to the pin 1 by a shoulder 61a having a matching countersink 63 made in the pin 1. A plug 64 is screwed onto the pin 1. This holds the squib 62 in place and ensures the gas tightness of the inner volume of the pin 1 (by means of O-rings 65, 66).

The squib 62 is connected by conductors 70 to an electronic control device (not shown) that notably incorporates a deceleration sensor and causes the different pyrotechnic safety systems of the vehicle to ignite further to a collision.

A sealing fail 69, that is a thin metallic sheet (of aluminum, for example) a few tens of millimeters thick is pinched between the support 61 and the second piston 52. It obturates the latter's axial bore 55.

This device operates as follows.

In the starting state (FIG. 3) a piston 51, 52 is positioned opposite each incipient fracture 4. The mechanical shear strength of the pin 1 is thus reinforced.

The pistons are axially immobilized with respect to the pin in their reinforcing position. The plug 64 holds the squib 62 in place which in turn applies the support 61 onto the pin and onto the second piston 52. The latter presses against a first piston 51 that is in abutment against the pin 1 via the collar 54.

When the automobile's electronics detect a strong deceleration, linked for example to a frontal collision, the squib 62 is ignited.

The gases generated by the squib develop inside the support 61 and exert pressure on the sealing fail 69 that temporarily confines the gases. The two pistons 52 and 51 are simultaneously pushed axially by means of the sealing fail 69 thereby causing the collar 54 to fracture. The relative thicknesses of the collar and the sealing fail will have been defined so that the collar 54 is fractured before the sealing fail 69.

The two pistons 51 and 52 are thus pushed axially and each comes into contact with its ring-shaped abutment 53 or 58.

The device now adopts the configuration shown in FIG. 4. The two incipient fractures 4 are released by the pistons 51 and 52, which remain in the unlocked position further to the gas pressure maintained inside the pin 1 thanks to the sealing means 65, 66.

The conical surfaces 56, 51d and 59, 60 promote the axial displacement of the pistons 51 and 52 when the latter are subjected to a radial force. Such an arrangement facilitates the release of the incipient fractures, even if the final axial position of the pistons is not quite correct. The effect of a bending stress applied to the pin 1 will be to facilitate the release of the incipient fractures. The reliability of the device is thus improved.

After the squib has been ignited and the pistons have been displaced, the pin 1 is made vulnerable to shearing. When the force F to which it is subjected exceeds a certain level it fractures, releasing the pedal 10.

Thus, if the squib 62 is inadvertently ignited, the pedal is embrittled but not fractured. It is thus possible for the driver to maneuver it thereby improving the safety of the device.

When there is a real collision, the pin 1 does not have enough mechanical strength and the pedal fractures without causing serious injuries to the driver's lower limbs.

The different parts of the pin can be made of metal or of a plastic material. The expert will easily define the dimensions (notably of the incipient fractures) to ensures the different mechanical strengths required.

The device will, for example, be defined such that in the starting condition the pin can withstand a shear force of 600 kg and that in the embrittled state it fractures at a shear force of 300 kg.

By way of a variant, it is possible for an embrittlement device to be defined that is adapted to a torsion stressed element.

Such a variant will, for example, be used in Anglo-Saxon (right-hand drive) vehicles to embrittle the swivel pin connecting the pedal, located to the right in the cab, and the master cylinder control that is always located to the left, as is the case for left-hand drive vehicles.

In this case, as for previous embodiments, an incipient fracture, such as a ring-shaped groove, for the mechanical element will be arranged and sliding reinforcement means placed level with the incipient fracture.

However, in this case, reinforcement means incorporating means to connect them in rotation with the element to be embrittled will be provided so as to ensure that the mechanical element and its reinforcement means remain joined in rotation (and thus in torsion) on either side of the incipient fracture.

Ribbing or indentations can, for example, be arranged on the external cylindrical surface of the reinforcement means that cooperate with matching profiles made on the inner surface of the element to be embrittled on either side of the incipient fracture.

Thus, stressing the mechanical element in torsion will also stress the reinforcement means in torsion. The torsion strength of the mechanical element will thus be ensured. Activating the displacement of the reinforcement means (for example by means of gases generated by a pyrotechnic squib) will position it at a distance from the incipient fracture. The reinforcement means will then be on a single and same side of the ring-shaped incipient fracture, and the mechanical element stressed in torsion will be embrittled as a result.

I claim:

1. An embrittlement device for a swivel pin of an automobile pedal, such device being characterized in that the pin incorporates at least one incipient fracture and at least one reinforcement means at a right angle to the incipient fracture and strengthening the pin, the reinforcement means being able to be displaced under action of drive means to take up a position at a distance from the incipient fracture thereby ensuring embrittlement of the pin, wherein the pin is sheared when a predetermined force is applied to the pin.

2. An embrittlement device according to claim 1, characterized in that the incipient fracture is made in a form of a reduction of a shearable surface, the reinforcement means being placed at a right angle to the incipient fracture thus enabling the shearable surface to be increased.

3. An embrittlement device according to claim 1, characterized in that the drive means comprise a pyrotechnic gas generator.

4. An embrittlement device according to claim 3, characterized in that the pin is a hollow rod incorporating at least one groove forming the incipient fracture and the reinforcement means is constituted by at least one piston able to be displaced by gas pressure.

5. An embrittlement device according to claim 4, characterized in that at least one piston is held axially in place by a shearable lock.

6. An embrittlement device according to claim 5, characterized in that the hollow rod incorporates two grooves constituting incipient fractures, and the reinforcement means comprises first reinforcement means constituted by a first piston and second reinforcement means constituted by a second hollow piston, the second piston pressing on the first piston so as to be able to push the first piston axially.

7. An embrittlement device according to claim 6, characterized in that the second piston is obturated by a sealing fail receiving the gas pressure and is able to fracture over a certain gas pressure rate.

8. An embrittlement device according to claim 6, characterized in that the first and second pistons press against one another via matching conical surfaces.

9. An embrittlement device according to claim 4 characterized in that each piston incorporates a shoulder co-operating at an end of a stroke with an abutment integral with the rod.

10. An embrittlement device according to claim 1, characterized in that the pin allows the automobile pedal to swivel with respect to a fork joint, the incipient fractures being located on either side of wings of the fork joint.

* * * * *